No. 616,523. Patented Dec. 27, 1898.
H. P. BUTLER.
CHART FOR FACILITATING OPERATION OF MULTIPLICATION.
(Application filed Feb. 11, 1898.)
(No Model.)
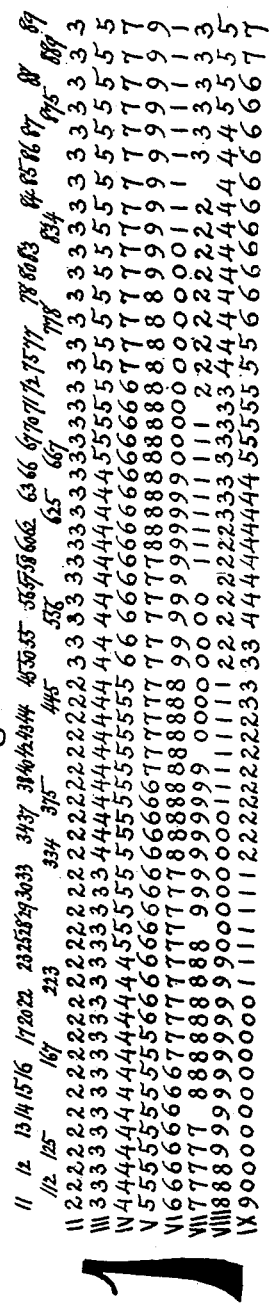
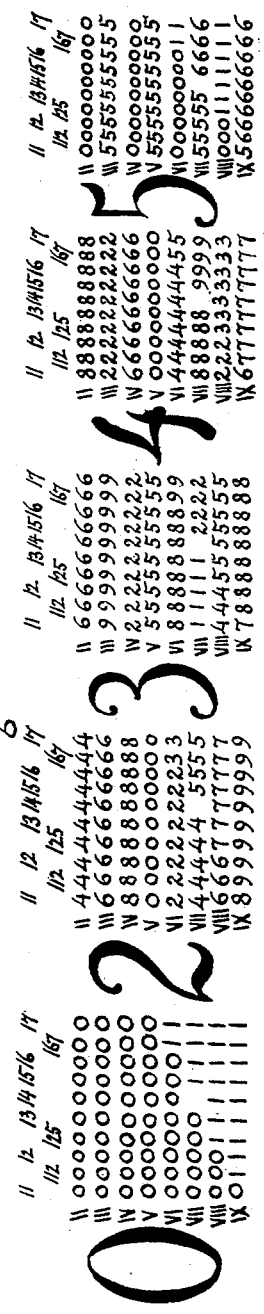
Witnesses.
Thomas H. Butler
Alfred P. Burr
Inventor.
Henry P. Butler
THE NORRIS PETERS CO., PHOTO-LITHO., WASHINGTON, D. C.

United States Patent Office.

HENRY P. BUTLER, OF NEW YORK, N. Y.

CHART FOR FACILITATING OPERATION OF MULTIPLICATION.

SPECIFICATION forming part of Letters Patent No. 616,523, dated December 27, 1898.

Application filed February 11, 1898. Serial No. 669,926. (No model.)

*To all whom it may concern:*

Be it known that I, HENRY P. BUTLER, of the city of New York, borough of Manhattan, in the State of New York, have invented a Chart for Facilitating the Operation of Multiplication, being a means for obtaining the result of the multiplication of numbers without resorting to the ordinary method involving the use of the multiplication-tables and recourse to mental calculations; and I do hereby declare that the following is a full, clear, and exact description of the same, reference being had to the annexed drawings, making a part of this specification.

This invention has relation to the arrangement in a chart or plan of sets of figures showing the unit of the local value of any certain figure in the product produced by its multiplication by another figure, by the use of which and observing most simple rules, hereinafter fully and at large set forth, certainty regarding the product is found and the wearisome method of multiplying ordinarily employed (continually subject to error by reason of mentally carrying the tens at each step) is entirely dispensed with.

There are certain elements of similarity between this application and a previous application made by me now pending in the United States Patent Office, which was filed December 18, 1897, bearing the serial number 662,460 and entitled "Improvement in Calculating Machines." The main feature, however, of this improvement set forth in this specification is founded upon associating two figures of the multiplicand immediately preceding the figure under examination to discover their combined effect upon the local value of the latter figure in the product and in exceptional cases the association of three figures in the multiplicand, whereas in my pending application the main feature is founded upon the effect of one figure of the multiplicand immediately preceding the figure under examination upon the local value of such latter figure in the product and in exceptional cases the association of two figures for that purpose, and I deem them separate and distinct inventions. Again, the difficulties which confronted me in my said previous invention relative to the multipliers "6," "7," "8," and "9," therein referred to, have been, by resorting to a different system exemplifying the effect of previous figures in the multiplicand upon the local value in the products of any figure under examination, entirely surmounted. As to the multipliers "2," "3," "4," and "5," I now, as then, employ the marginal figure and the groups of figures opposite each marginal figure, and there is no change in such groups of figures as to the component parts of such groups of figures, (so far as they relate to "2," "3," "4," and "5;") but whereas in my pending application I employ opposite each marginal figure fourteen different groups of figures I now employ sixty-one, incorporating in the main chart all of the "exceptions," and whereas in the pending application I placed all the exceptions in four columns, forming one class by themselves, (such incorporating alone not being subject of invention,) and instead of having each group of figures dominated by a certain figure as to the main body and as to the exceptions dominated by two figures now the groups of figures all located in a common body are dominated always by two figures and in the exceptional cases by three.

In the process of multiplying when several figures constitute the multiplicand and the multiplier is either "2," "4," or "5" it will be found that the relative effect, whether passive or active, of each two figures in the multiplicand upon the local value in the products of an adjoining figure in the multiplicand next succeeding them on the left is always and invariably the same.

My definition of "local value" of a figure is its value when used with another figure or figures in the same number. Thus, "325." The local value of the "3" is three hundred, or three hundreds; of the "2" is twenty, or two tens; of the "5" is five units. The local value in the product of 326×2

| Thousands. | Hundreds. | Tens. | Units. |
|---|---|---|---|
|  | 6 | 5 | 2 |

In the term "local value in the products" I give to the words "local value" an added significance—i. e., that of relational value—as well, as I mean it to indicate the result of multiplying a certain figure of a multiplicand by a given multiplier and expressing it (the result) in the product when that result has been affected either actively or passively by the multiplication of previous figures of a multiplicand by the same multiplier. Example: 540×2. Local value of the "5" of the multiplicand is

| Thousands. | Hundreds. | Tens. | Units. |
|---|---|---|---|
| 1 | 0 |  |  | in the product. 560×2. The local value of the "5" of the multiplicand is

| Thousands. | Hundreds. | Tens. | Units. |
|---|---|---|---|
| 1 | 1 |  |  | in the product. By this I mean that in the example 540×2 the active effect of the "40" upon the "5" is unvarying (no matter whether the multiplicand contains figures to the right of the "40" or not) and the local value in the product of the "5" of the multiplicand is always one thousands, no hundreds, or removed farther places to the left 540×2=1080, or one thousand, no hundreds, eight tens, and no unit. In the example 560×2 the active effect of the "60" upon the "5" is unvarying, (no matter whether the multiplicand contains figures to the right of the "60" or not,) and the local value of the "5" is always

| Thousands. | Hundreds. | Tens. | Units. |
|---|---|---|---|
| 1 | 1 |  |  | one thousand, one hundred, or removed farther places to the left, 560×2=1120, or one thousand, one hundred, two tens, and no unit. I deduce, therefore, that the relative effect of each two figures composing the numbers "10," (which includes for the purposes of the chart "01, 02, 03, 04, 05, 06, 07, 08, 09,") to "99" in the multiplicand exert an unvarying influence in each and every instance upon the local value in the products of an adjoining figure in the multiplicand next succeeding them on the left when the multiplier is either "2," "4," or "5." With multipliers "3, 6, 7, 8, 9" there are many instances where numbers between "10" and "99" exert a varying influence owing to figures on their right in the multiplicand which effect them and cause them to effect figures which succeed them on the left.

When the multiplier is "3," it will be found that the relative effect of the two figures preceding the figure under examination is unvarying except after "33" and "66." When such figures precede the figure under examination, regard must be had for the figure preceding such figures. For instance, "1" after "334," "335," "336," "337," "338" or "339" the local value of the "1" in the product is "4," whereas "1" after "330," "331" and "332" the local value of the "1" is "3." Consequently in the chart I indicate under the column-header "33" that the local value is "3," and in the next column headed by the figures "334" I indicate that when the preceding figures in the multiplicand are "334," "335," "336," "337," "338," or "339" the local value is "4."

When the multiplier is "6," it will be found that the relative effect, whether passive or active, of each two figures in the multiplicand upon the local value in the product of an adjoining figure in the multiplicand next succeeding them on the left is always and invariably the same when such figures are other than "16," "33," "66," or "83." When such figures precede the figure under examination, regard must be had for the figure preceding such figures—for instance, "1" after "167," "168," or "169" the local value of the "1" in the product is "7," whereas "1" after "161," "162," "163," "164," "165," and "166" the local value of the "1" is "6." Consequently in the chart I indicate under the "16" that the local value is "6," and in the next column headed by the figures "167" I indicate that when the preceding figures in the multiplicand are "167," "168," or "169" the local value is "7."

When the multiplier is "7," it will be found that the relative effect, whether passive or active, of each two figures in the multiplicand upon the local value in the product of an adjoining figure in the multiplicand next succeeding them on the left is always and invariably the same when such two figures are either "10" or any numbers above "10" to and including "99," excepting always "14," "28," "42," "57," "71," and "85." After each of these numbers a variation from any arbitrary plan is always possible, and any rule to be of the slightest value as a time-saver must attach to something else than the relative positions of figures in the multiplicand—for instance "0" in the multiplicand. The local value thereof in the product when the preceding two figures are "15" is "1." Its local value when the preceding figures are "14" may be "0" or may be "1." It is "1" only when the local value of the "1" composing with "4" the figures "14" is "0," and in all other cases whatsoever the local value of the cipher of the multiplicand is "0" in the product. Hence as the possibilities of producing as the local value in the product of the "1" (of the "14") are too numerous to be availed of in any arbitrary plan concerning the arrangement of figures in the multiplicand I have resorted to the surprisingly simple expedient of glancing at the last figure of the partial product, and if such figure is "0" I know that the local value of the cipher of the multiplicand in the product must be "1," otherwise "0."

By reference to the drawings, Figure 1, it will be seen that in the horizontal line opposite small marginal VII a vacant place is left under the column-headers "14," "28," "42," "57," "71," and "85." In practice this vacant place will be supplied with a figure either from the left hand or right hand of the vacancy that an observation of the last figure of the partial product will instantly indicate.

When the multiplier is "8," it will be found that the relative effect of the two figures preceding the figure under examination is unvarying except after "12," "37," "62," and "87." For the exceptions I provide four columns of exceptions, which are headed, respectively, "125," "375," "625," and "875," relatively speaking, the same as when the multiplier is "6," as by reference to the drawings, Fig. 1, will fully appear.

In my charts for general use the exception columns would be in red print to attract the eye and affect the mind that they are "exception" columns.

When the multiplier is "9," it will be found that the relative effect of the two figures preceding the figure under examination is unvarying except after "11, 22, 33, 44, 55, 66, 77, 88." For the exceptions I provide eight columns of exceptions, which are headed, respectively, "112, 223, 334, 445, 556, 667, 778, 889," relatively speaking, the same as when the multiplier is "6" or "8," as by reference to the drawings, Fig. 1, will fully appear.

As an illustration of the rule governing the exceptions, I show the following, and take for the illustration the digits multiplied by "9," respectively, and preceded by "0," "1," "2," "3," "4," "5," "6," "7," "8," and "9," respectively, in the multiplicand.

9 times

|   | 0 | 1 | 2 | 3 | 4 | 5 | 6 | 7 | 8 | 9 |
|---|---|---|---|---|---|---|---|---|---|---|
| 0 | 0 | 0 | 1 | 2 | 3 | 4 | 5 | 6 | 7 | 8 |
| 1 | 9 | 9 | *0 | 1 | 2 | 3 | 4 | 5 | 6 | 7 |
| 2 | 8 | 8 | 9 | *0 | 1 | 2 | 3 | 4 | 5 | 6 |
| 3 | 7 | 7 | 8 | 9 | *0 | 1 | 2 | 3 | 4 | 5 |
| 4 | 6 | 6 | 7 | 8 | 9 | *0 | 1 | 2 | 3 | 4 |
| 5 | 5 | 5 | 6 | 7 | 8 | 9 | *0 | 1 | 2 | 3 |
| 6 | 4 | 4 | 5 | 6 | 7 | 8 | 9 | *0 | 1 | 2 |
| 7 | 3 | 3 | 4 | 5 | 6 | 7 | 8 | 9 | *0 | 1 |
| 8 | 2 | 2 | 3 | 4 | 5 | 6 | 7 | 8 | 9 | *0 |
| 9 | 1 | 1 | 2 | 3 | 4 | 5 | 6 | 7 | 8 | 9 |

Each "0" marked with a star (*) represents "10," and consequently the next figure of the partial product must have one more added to it than if it were preceded by the "9." Therefore when the figures in the multiplicand are "1,112" the local value of the left-hand figure in the product would as to its unit-figure be "0" instead of "9," being effected by the multiplication of the "2" by "9." Relatively speaking the same rule runs through the chart. As to "7" multiplier, however, as has been seen, I adopt for the purposes of the chart another way of enunciating that principle. Hence we find that following this formula we obtain a scheme of figures that may be applied to all the ten figures, as will appear by reference to the accompanying delineations, wherein, however, in Fig. 1 the subject of "1" is used as the large marginal figure as illustration of the whole of a chart, portions of the others—"0," "2," "3," "4," "5," "6," "7," "8," and "9"—being shown in Fig. 2 to indicate how as to them the scheme is applied, their continuance to completion being, relatively speaking, the same as when marginal "1" is the subject.

In the delineations on the accompanying sheet of drawings Fig. 1 shows the whole of the chart appertaining to the figure "1," represented by the large marginal "1." Next to it are eight numbers in Roman figures, indicating the multipliers and not necessarily forming a part of the chart. In the ensuing perpendicular lines are given, respectively, the unit-figure of the local value in the products of the figure "1" in a multiplicand when preceded by any figure whatsoever, also multiplied by the multipliers "2, 3, 4, 5, 6, 7, 8, 9." In the first of such perpendicular lines are given "2, 3, 4, 5, 6, 7, 8, 9." They signify that "1" succeeding "11" (all numbers under "11," while not appearing, would have same effect) in a multiplicand is "2" in the product when the multiplier is "2," and so on with the seven other multipliers. The rest of the chart shows, so to speak, the growth of the said numbers "2, 3, 4, 5, 6, 7, 8, 9" to "3, 5, 7, 9, 11, 13, 15, 17," represented by "3, 5, 7, 9, 1, 3, 5, 7," as the figure "1" is affected by numbers greater than "11" preceding said "1" in the multiplicand, also multiplied by the same multipliers. The delineations in Fig. 2 show in fragmentary form the figures "0, 2, 3, 4, 5, 6, 7, 8, 9" treated precisely, so far as the delineations extend, as the "1" in Fig. 1, and the explanations hereinabove addressed to the construction of the perpendicular lines in Fig. 1 will make it plain to one familiar with the art of numbers how to extend the said fragments to completed charts similar in effect to that delineated in Fig. 1, as the growth, so to speak, of each figure in the first perpendicular line of the chart is relatively exactly like that shown in Fig. 1.

To obviate the necessity of having the delineations cover four sheets of paper instead of one, I have carried the figures "0, 2, 3, 4, 5, 6, 7, 8" to and including the tenth perpendicular line of a chart and the figure "9" to and including the twenty-seventh line of a chart. As it is simply working with different figures, but in precisely the same way, it seemed to me proper to make the delineations as compact as possible rather than have a multiplicity of sheets.

In the delineations the large marginal figures are the ones to be acted upon by the multipliers and are such as I have above described as the "figure under examination." The small Arabic figures opposite the marginal figures and in eight parallel lines show the unit-figure of the value of the marginal figure in the several products, and the figures at the top show, in sets of two or three, the preceding figures in the multiplicand, (if any,) which having been multiplied act upon the figure under examination and affect its local value in the products. The arrangement of figures, including a marginal figure, the several groups of figures under the figures heading each column, and such latter figures constitute what I call a "chart," and ten of such charts, each relating to a different figure, I have denominated "duo multplichart" to distinguish it from the multplichart shown in my previous application now pending in the Patent Office.

For further illustration I desire to show how the chart is employed, using the figures "675334896" as multiplicand and "2, 3, 4, 5, 6, 7, 8, 9" each an individual multiplier.

|   |   |   |   |   |   |   |   |   | Multipliers. |
|---|---|---|---|---|---|---|---|---|---|
| 6 | 7 | 5 | 3 | 3 | 4 | 8 | 9 | 6 |   |
| 1 | 3 | 5 | 0 | 6 | 6 | 9 | 7 | 9 | 2 | 2 |
| 2 | 0 | 2 | 6 | 0 | 0 | 4 | 6 | 8 | 8 | 3 |
| 2 | 7 | 0 | 1 | 3 | 3 | 9 | 5 | 8 | 4 | 4 |
| 3 | 3 | 7 | 6 | 6 | 7 | 4 | 4 | 8 | 0 | 5 |
| 4 | 0 | 5 | 2 | 0 | 0 | 9 | 3 | 7 | 6 | 6 |
| 4 | 7 | 2 | 7 | 3 | 4 | 4 | 2 | 7 | 2 | 7 |
| 5 | 4 | 0 | 2 | 6 | 7 | 9 | 1 | 6 | 8 | 8 |
| 6 | 0 | 7 | 8 | 0 | 1 | 4 | 0 | 6 | 4 | 9 |

The first group of figures is found opposite large marginal "6" at the extreme left hand. For the sake of condensation the chart commences with "11" as figure to indicate the column to be taken. Everything below "11" would be the same as that. The second group of figures is found opposite large marginal "9" under the column-header "60," the theory of the chart being the succession of one figure after a set of two figures or three figures. The third group is found opposite large marginal "8" under column-header "89." Everything above "89" would be the same as that, and for the sake of condensation the chart ends at "89." The fourth group is found opposite large marginal "4" under the column-header "89." The fifth is found opposite marginal "3," column-header "45," as from "44" to "50" there is no possibility of change. Consequently I have condensed the chart without affecting its usefulness—in fact, enhancing it. The sixth group is found opposite marginal "3" under column-header "34," the seventh opposite marginal "5" under column-header "334," not under column-header "33," as it would be if the figures were "332" instead of "334," for the reason that the multiplication of the "4" by "3," "6," and "9," respectively, produces in one instance a "1" to be carried to the next column, making the unit-figure in the product of the "3" a "0," in the second instance a "2" to be carried to the next column, making the unit-figure in the product of the "3" a "0," and in the third instance a "3" or more to be carried to the next column, making the unit-figure in the product of the "3" a "0," and in each instance providing "1" to be carried to the product of the second "3" after the "4." The eighth group of figures is found opposite marginal "7" under the column-header "50," and the ninth opposite marginal "6" under column-header "75."

It will be observed that I have omitted the "finals" from this chart. The slightest practice will accustom the user of the chart to supply the finals, and to have them incorporated in the chart would lengthen it needlessly.

When either "1, 2, 3, 4, 5, 6, 7, 8," respectively, occur in a series like "1111 22222," preceded by a figure greater than itself, the effect of such greater figure must be recognized throughout the series. The proximity of the double-figure column-header and the following column-header—for instance, "22, 223"—is sufficient reminder to the user of the chart and the eye will instinctively glance backward over the multiplicand.

I do not wish to confine myself to the exact plan shown in the accompanying drawings of arranging the groups of figures showing the unit of the local value of any certain figure in the product. I deem the arrangement shown by the drawings preferable to any other for the reason that there the figure under examination being represented by the large marginal figure is made prominent and conspicuous; but in many respects an effective and useful chart can be made by reversing the general arrangement of the groups of figures and locating the figures that in the drawings are situated at the head of the colums instead of at the head of the columns on the side or margin, and the figures therein shown as marginal figures instead of in the margin at the head of the columns, and assorting the groups of figures to correspond with such reversal of the test figures. By such transposition, not in any way effecting a change in my invention or in any way affecting the groups of figures, as to their component parts, or in any way affecting the relation between what I have described as the marginal figure and the figures heading the columns, the chart might be made as follows. To prevent unnecessary length, I carry the chart from the commencement to 40 only.

```
        0 1 2 3 4 5 6 7 8 9                    0 1 2 3 4 5 6 7 8 9
   0    0 2 4 6 8 0 2 4 6 8           223      0 2 4 6 8 0 2 4 6 8
        0 3 6 9 2 5 8 1 4 7                    0 3 6 9 2 5 8 1 4 7
        0 4 8 2 6 0 4 8 2 6                    0 4 8 2 6 0 4 8 2 6
        0 5 0 5 0 5 0 5 0 5            24      1 6 1 6 1 6 1 6 1 6
   to   0 6 2 8 4 0 6 2 8 4                    1 7 3 9 5 1 7 3 9 5
        0 7 4 1 8 5 2 9 6 3                    1 8 5 2 9 6 3 0 7 4
        0 8 6 4 2 0 8 6 4 2                    1 9 7 5 3 1 9 7 5 3
   11   0 9 8 7 6 5 4 3 2 1                    2 1 0 9 8 7 6 5 4 3
  112   0 2 4 6 8 0 2 4 6 8            25      0 2 4 6 8 0 2 4 6 8
        0 3 6 9 2 5 8 1 4 7                    0 3 6 9 2 5 8 1 4 7
        0 4 8 2 6 0 4 8 2 6                    1 5 9 3 7 1 5 9 3 7
        0 5 0 5 0 5 0 5 0 5            26      1 6 1 6 1 6 1 6 1 6
        0 6 2 8 4 0 6 2 8 4            27      1 7 3 9 5 1 7 3 9 5
        0 7 4 1 8 5 2 9 6 3                    1 8 5 2 9 6 3 0 7 4
        0 8 6 4 2 0 8 6 4 2                    2 0 8 6 4 2 0 8 6 4
   12   1 0 9 8 7 6 5 4 3 2                    2 1 0 9 8 7 6 5 4 3
  125   0 2 4 6 8 0 2 4 6 8            28      0 2 4 6 8 0 2 4 6 8
        0 3 6 9 2 5 8 1 4 7                    0 3 6 9 2 5 8 1 4 7
        0 4 8 2 6 0 4 8 2 6                    1 5 9 3 7 1 5 9 3 7
   13   0 5 0 5 0 5 0 5 0 5                    1 6 1 6 1 6 1 6 1 6
        0 6 2 8 4 0 6 2 8 4                    1 7 3 9 5 1 7 3 9 5
        0 7 4 1 8 5 2 9 6 3                    1 8 5 2 9 6 3 0 7 4
        1 9 7 5 3 1 9 7 5 3                    2 0 8 6 4 2 0 8 6 4
        1 0 9 8 7 6 5 4 3 2                    2 1 0 9 8 7 6 5 4 3
   14   0 2 4 6 8 0 2 4 6 8            29      0 2 4 6 8 0 2 4 6 8
        0 3 6 9 2 5 8 1 4 7                    0 3 6 9 2 5 8 1 4 7
        0 4 8 2 6 0 4 8 2 6                    1 5 9 3 7 1 5 9 3 7
        0 5 0 5 0 5 0 5 0 5                    1 6 1 6 1 6 1 6 1 6
        0 6 2 8 4 0 6 2 8 4                    1 7 3 9 5 1 7 3 9 5
        0 7 4 1 8 5 2 9 6 3                    2 9 6 3 0 7 4 1 8 5
        1 9 7 5 3 1 9 7 5 3                    2 0 8 6 4 2 0 8 6 4
        1 0 9 8 7 6 5 4 3 2                    2 1 0 9 8 7 6 5 4 3
   15   0 2 4 6 8 0 2 4 6 8            30      0 2 4 6 8 0 2 4 6 8
        0 3 6 9 2 5 8 1 4 7                    0 3 6 9 2 5 8 1 4 7
        0 4 8 2 6 0 4 8 2 6                    1 5 9 3 7 1 5 9 3 7
        0 5 0 5 0 5 0 5 0 5            31      1 6 1 6 1 6 1 6 1 6
        0 6 2 8 4 0 6 2 8 4                    1 7 3 9 5 1 7 3 9 5
        1 8 5 2 9 6 3 0 7 4            32      2 9 6 3 0 7 4 1 8 5
        1 9 7 5 3 1 9 7 5 3                    2 0 8 6 4 2 0 8 6 4
   16   1 0 9 8 7 6 5 4 3 2            33      2 1 0 9 8 7 6 5 4 3
  167   0 2 4 6 8 0 2 4 6 8           334      0 2 4 6 8 0 2 4 6 8
        0 3 6 9 2 5 8 1 4 7                    1 4 7 0 3 6 9 2 5 8
        0 4 8 2 6 0 4 8 2 6                    1 5 9 3 7 1 5 9 3 7
   17   0 5 0 5 0 5 0 5 0 5            34      1 6 1 6 1 6 1 6 1 6
        1 7 3 9 5 1 7 3 9 5            35      2 8 4 0 6 2 8 4 0 6
   18   1 8 5 2 9 6 3 0 7 4            36      2 9 6 3 0 7 4 1 8 5
        1 9 7 5 3 1 9 7 5 3                    2 0 8 6 4 2 0 8 6 4
   19   1 0 9 8 7 6 5 4 3 2            37      3 2 1 0 9 8 7 6 5 4
   20   0 2 4 6 8 0 2 4 6 8           375      0 2 4 6 8 0 2 4 6 8
        0 3 6 9 2 5 8 1 4 7                    1 4 7 0 3 6 9 2 5 8
        0 4 8 2 6 0 4 8 2 6                    1 5 9 3 7 1 5 9 3 7
   21   1 6 1 6 1 6 1 6 1 6            38      1 6 1 6 1 6 1 6 1 6
        1 7 3 9 5 1 7 3 9 5                    2 8 4 0 6 2 8 4 0 6
   22   1 8 5 2 9 6 3 0 7 4            39      2 9 6 3 0 7 4 1 8 5
        1 9 7 5 3 1 9 7 5 3                    3 1 9 7 5 3 1 9 7 5
        1 0 9 8 7 6 5 4 3 2                    3 2 1 0 9 8 7 6 5 4
```

The groups of figures opposite "0" to "11" on this portion of a chart are those found in the drawing in the first line group opposite marginal "0," "1," "2," "3," "4," "5," "6," "7," "8," and "9." Next groups, those opposite "112" to "12," are those found in the drawing in the second line group opposite those marginal figures, and so on.

In using the "duo multplichart" I employ a piece of stiff paper about the size of a playing-card and place it alongside of the column desired, as in practice I invariably give a last glance at the group in the chart before removing the card to verify the figures.

Having now fully described my invention, what I claim as new, and desire to secure by Letters Patent, is—

1. A chart designed to facilitate arithmetical calculation, said chart having thereupon a figure under examination, and sets of figures, each set indicating the local value in the product of the figure under examination when multiplied by some digit, the individual figures in the several sets, which indicate the particular amounts of said local value in the product, being grouped under such figures as may occur with the figure under examination at its right to vary said amounts.

2. A chart designed to facilitate arithmetical calculation, said chart having thereupon a figure under examination, and eight sets of figures each set indicating the local value in the product of the figure under examination when multiplied by one of the digits "2, 3, 4, 5, 6, 7, 8, 9," the individual figures in such sets which indicate the particular amounts of said local value in the product, being grouped under such figures as may occur with the figures under examination at its right to vary said amounts.

3. A chart designed to facilitate arithmetical calculation, said chart having thereupon a set of ten digits representing the ten possible figures that may become figures under examination, and associated with each of said digits eight sets of figures, each set indicating the local value in the product of the digit with which it is associated when that digit is multiplied by one of the digits "2, 3, 4, 5, 6, 7, 8, 9," the individual figures in said sets, which indicate the particular amounts of said local value in the product, being grouped under such figures as may occur with any particular figure under examination at its right to vary said amounts.

4. A chart designed to facilitate arithmetical calculation, said chart having thereupon a figure under examination, and sets of figures, each set indicating the local value in the product of the figure under examination when multiplied by some digit, the individual figures in said sets, which indicate the particular amounts of said local value in the product, being grouped under such figures as may occupy places at the right of the figure under examination to vary said amounts, said figures that may vary said amounts being arranged according as they occupy two places or three at the right of the figure under examination.

5. A chart designed to facilitate arithmetical calculation, said chart having thereupon a figure under examination, and sets of figures, each set indicating the local value in the product of the figure under examination when multiplied by one of the digits "2, 3, 4, 5, 6, 7, 8, 9," the individual figures in said sets, which indicate the particular amounts of said local value in the product, being grouped under such figures as may occupy places at the right of the figure under examination to vary said amounts, said figures that may vary said amounts being arranged according as they occupy two places or three at the right of the figure under examination.

6. A chart designed to facilitate arithmetical calculation, said chart having thereupon a set of ten digits representing the ten possible figures that may become figures under examination, and associated with each of said digits eight sets of figures, each set indicating the local value in the product of the digit with which it is associated when that digit is multiplied by one of the digits "2, 3, 4, 5, 6, 7, 8, 9," the individual figures in said sets, which indicate the particular amounts of said local value in the product, being grouped under such figures as may occupy places at the right of the digit with which they are associated to vary said amounts, said figures that may vary said amounts being arranged according as they occupy two places or three at the right of the figure under examination.

HENRY P. BUTLER.

Witnesses:
 MAX E. BUTLER,
 ALFRED P. BURR.